United States Patent
Ritter et al.

(10) Patent No.: US 6,216,326 B1
(45) Date of Patent: Apr. 17, 2001

(54) TUBE PULLING APPARATUS

(75) Inventors: Ronald A. Ritter, 842 Mt. Zion Church Rd., Casar, NC (US) 28020; Michael R. Wilkerson, Davenport, FL (US)

(73) Assignee: Ronald A. Ritter, Casar, NC (US)

( * ) Notice: Subject to any disclaimer, the term of this patent is extended or adjusted under 35 U.S.C. 154(b) by 0 days.

(21) Appl. No.: 09/490,438

(22) Filed: Jan. 24, 2000

Related U.S. Application Data

(63) Continuation of application No. 09/161,639, filed on Sep. 28, 1998.

(51) Int. Cl.⁷ .................................................. B23P 19/04
(52) U.S. Cl. ................................ 29/252; 29/282; 29/255; 29/280
(58) Field of Search ........................... 29/252, 253, 255, 29/280, 282, 93 R; 269/3, 6

(56) References Cited

U.S. PATENT DOCUMENTS

| | | | |
|---|---|---|---|
| 3,507,028 | * | 4/1970 | Stellatella ........................... 29/252 |
| 3,791,011 | | 2/1974 | Keys . |
| 4,000,556 | | 1/1977 | Ciminero . |
| 4,077,102 | | 3/1978 | Smith . |
| 4,213,239 | | 7/1980 | Filer . |
| 4,214,362 | * | 7/1980 | Beard ................................. 29/252 |
| 4,283,826 | | 8/1981 | Miller . |
| 4,369,569 | | 1/1983 | Armstrong, Jr. et al. . |
| 4,459,728 | * | 7/1984 | Gaquere ............................... 29/252 |
| 4,583,388 | * | 4/1986 | Hogenhout .......................... 29/252 |
| 4,627,155 | | 12/1986 | Mancabelli . |
| 4,679,315 | * | 7/1987 | Overbay .............................. 29/252 |
| 4,959,899 | * | 10/1990 | Martin . |
| 5,138,754 | * | 8/1992 | Casteel et al. ..................... 29/252 |
| 5,159,743 | | 11/1992 | Somerville . |
| 5,208,967 | | 5/1993 | Beard . |

* cited by examiner

*Primary Examiner*—Joseph J. Hail, III
*Assistant Examiner*—Lee Wilson
(74) *Attorney, Agent, or Firm*—William M. Hobby, III

(57) ABSTRACT

A tube pulling apparatus has a body having a hydraulic fluid feeder tube extending to the body to pass oil under pressure therethrough. An inner shaft in the body has a hollow portion slidably mounted over the feeder tube and receives oil in an open area in the inner shaft. An inner piston is connected to the inner shaft and positioned to move the inner shaft responsive to oil pressure from a pair of oil lines. An outer shaft is slidably mounted over the inner shaft and has an outer piston connected thereto and positioned to move the outer shaft responsive to oil pressure from the oil lines. A spool valve is formed between the inner and outer shafts for activating the outer piston upon a predetermined movement of the inner shaft inside the outer shaft and a tube gripping mechanism is connected to both the inner and outer shafts for gripping and pulling a tube therewith by sliding the inner shaft to activate the gripping jaws and sliding the outer shaft to pull the gripped tube.

10 Claims, 1 Drawing Sheet

TUBE PULLING APPARATUS

This application is a continuation of my prior U.S. patent application Ser. No. 09/161,639 filed Sep. 28, 1998 entitled Tube Pulling Apparatus.

BACKGROUND OF THE INVENTION

The present invention relates to a tube pulling apparatus and more particularly to a tube pulling apparatus which is adapted to pull tubes from a tube sheet of heat exchangers, condensers and the like. This application is a continuation of my prior U.S. patent application Ser. No. 09/161,639 filed Sep. 28, 1998 entitled Tube Pulling Apparatus.

In condensers, boilers, and heat exchangers where two fluids are brought into thermal communication, it is customary to pass one fluid through a plurality of tubes and to pass the other fluid around the exterior of the tubes. The fluid passing around the exterior of the tubes is contained in the shell of the heat exchanger. In most constructions, the tubes are spaced apart and separated from the fluid in the shell by two end plates commonly known as tube sheets. Each tube sheet contains a plurality of holes into which the tubes are inserted. The tubes extend between the tube sheets so that a fluid-tight barrier is formed between the two fluids. To anchor each tube in its respective hole in the tube sheet, the end of the tube is expanded and flared.

It is customary to replace heat exchanger tubes after they have become corroded and pitted and when they commence leaking fluid across the barrier. In replacing tubes, it is common to hydraulically extract the old tubes from the tube sheet and replace them with new tubes.

Hydraulically-operated tube pullers are well known and generally include a tubular housing placed in abutment with a tube sheet so that a gripping member projecting therefrom will be received within the tube to be extracted. The gripping member is radially expanded into biting engagement with the internal surface of the tube by a wedging element. A first piston, which is connected to the wedging element, moves the wedging element relative to the gripping member to effect its expansion. The first piston cooperates with a second piston, which is connected to the gripping member, to conjointly retract the wedging element and the gripping member, resulting in the extraction of the tube from the tube sheet.

Prior art patents for tube pullers can be seen in the Martin U.S. Pat. No. 4,959,899, for a tube pulling device for extracting a tube from a tube sheet in heat exchangers, condensers, and the like and has a shaft for expanding the gripping jaws of a tube puller and a second shaft for pulling the gripped tube. Each of the two shafts is hydraulically actuated. In the Armstrong, Jr. U.S. Pat. No. 4,369,569, a tube pulling apparatus is provided which pulls tubes from tube sheets of heat exchangers, condensers, and similar equipment and hydraulically actuates one shaft that actuates the gripping jaws and which shaft is driven by a first piston. Once the gripping jaws are fully expanded, the first piston cooperates with the second piston which is connected to the gripping jaws to extract the expansion rod and the gripping jaws to extract the tube. The Smith U.S. Pat. No. 4,077,102, shows another tube extracting mechanism for extracting tubes from a tube sheet and which compensates for variations due to manufacturing tolerances in the inside diameters of the tubes being extracted from the sheet.

In the Ciminero U.S. Pat. No. 4,000,556, a method and apparatus for extracting tubes from heat exchangers simultaneously pulls a pair of sliding wedging jaws within a tube to be extracted while extracting the tube. The Somerville U.S. Pat. No. 5,159,743, is a hydraulic puller having a base assembly about a central axis and a camming assembly about the base assembly and a readily removable hydraulic module axially centered in the base assembly to allow for a convenient assembly and disassembly of the hydraulic puller unit. The Beard U.S. Pat. No. 5,208,967, is a tube extraction apparatus for tubes and the like suitable for removing condenser and heat exchanger tubes from their mountings in electrical power generation systems. The Keys U.S. Pat. No. 3,791,011, is a tube pulling device for pulling tubes from a tube sheet in heat exchangers, condensers and the like and has an inner piston connected to a tube gripping means for initially gripping the inside of the tube when fluid pressure is applied to the inner piston. An outer piston is exposed through an open port means from the hydraulic fluid at the time of the gripping of the tube. In the Filer U.S. Pat. No. 4,213,239, a tube extractor utilizes a fluid pressure activated broach which is expanded and drawn into the end of the tube without expanding the outside diameter of the tube which then withdraws the tube from the tube sheet. The Miller U.S. Pat. No. 4,283,826, is a tube extracting mechanism for extracting tubes from a tube sheet and includes an expansion hydraulic cylinder for imparting longitudinal movement to a mandrel and then pulling hydraulic cylinders for imparting longitudinal movement to a sleeve and expandable jaw. The Mancabelli U.S. Pat. No. 4,627,155, is a tube extracting apparatus having a pulling shaft connected to a gripping assembly for gripping the tube.

The present invention is an improvement to the operation of a tube extracting apparatus which utilizes a first shaft for gripping the inner part of a tube and a second pulling shaft for pulling the tube. The shafts interconnect with a spool valve for first activating the gripping jaws to grip the inside of a tube to be pulled and then activating a pulling shaft to pull the tube from a tube sheet of a heat exchanger or condenser.

SUMMARY OF THE INVENTION

A tube pulling apparatus has a body having a hydraulic fluid feeder tube extending into the body to pass oil under pressure therethrough. An inner shaft in the body has a hollow portion slidably mounted over the feeder tube and receives oil in an open area in the inner shaft. An inner piston is connected to the inner shaft and positioned to move the inner shaft responsive to oil pressure from a pair of oil lines. An outer shaft is slidably mounted over the inner shaft and has an outer piston connected thereto and positioned to move the outer shaft responsive to oil pressure from the oil lines. A spool valve is formed between the inner and outer shafts for activating the outer piston upon a predetermined movement of the inner shaft inside the outer shaft and a tube gripping mechanism is connected to both the inner and outer shafts for gripping and pulling a tube therewith by sliding the inner shaft to activate the gripping jaws and sliding the outer shaft to pull the gripped tube.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
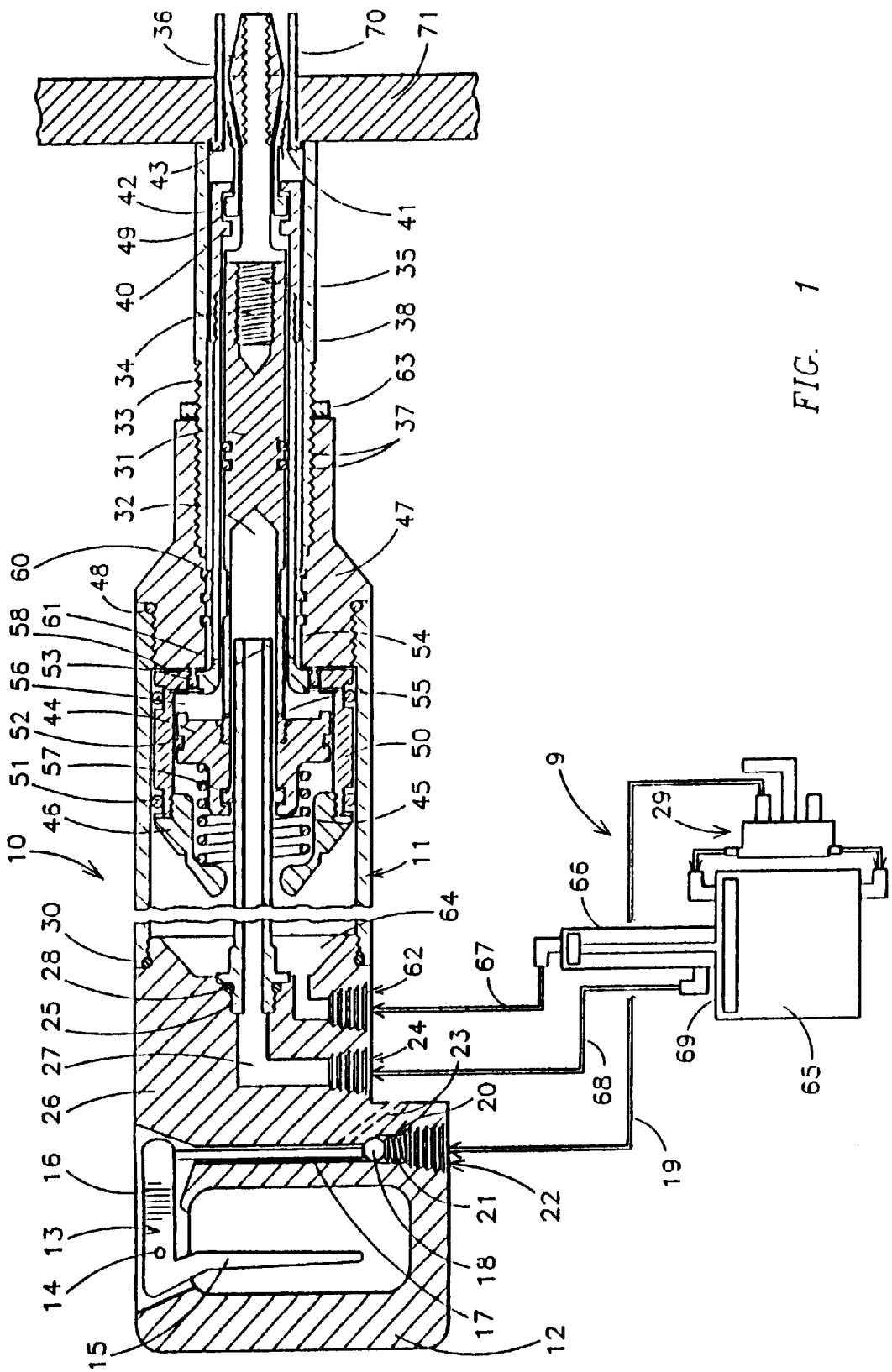
FIG. 1 is a cross-sectional view of a tube puller in accordance with the present invention.

Referring to the drawings, a hydraulic tube puller 10 is powered by a pneumatic/hydraulic intensifier 9 and is illustrated having a tubular body 11 along with a handle 12. A port 22 of the tube puller 10 is attached to a pneumatic actuator line 19 that is in turn attached to a pneumatic valve 29 on the intensifier 9. The intensifier 9 has a bottom air cylinder 65 under a hydraulic cylinder 66. The air cylinder is connected through the air valve 29 to the air trigger line 19. The hydraulic cylinder 66 is connected through hydraulic fluid line 67 which is connected to the port 62. The opposite side of hydraulic cylinder 66 is connected to hydraulic fluid line 68 which is connected to port 24. The handle 12 has a trigger 13 supported on a pin 14. The trigger 13 is an L-shaped trigger turning on the pin 14 so that when the trigger handle 15 is pulled, the lever portion 16 pushes on the push rod 17 to drive the ball 18 of the check valve 20 against the spring 21 to allow air under pressure to enter the port 22 and exit the passageway 23. The sudden release of the air pressure actuates the intensifier 9 and the hydraulic tube puller 10 to pull a tube.

A feeder tube 25 is anchored into the frame portion 26 having the passageway 27 connecting to the passageway of the feeder tube 25. The feeder tube 25 is threaded into the framework 26 on O-rings 28 while the housing 11 is threaded onto the housing 26 and onto O-rings 30. An inner shaft 31 has a bore 32 therein which slides over the feeder tube 25 and slides within an outer pull tube 33. The shaft 31 has a threaded bore 34 for anchoring a pull rod 35 which has a cam nut 36 on the end thereon. The shaft 31 and the pull tube 33 slide within each other and are spaced by O-rings 37. The tube 33 slides within a brace tube 38. The pull tube 33 has a jaw holder 40 on one end thereof holding the jaws 41 with jaw ledge 42 in an annular groove 49. Thus, when the shaft 31 is pulled rearward, the cam nut 36 will be drawn within the jaws 41 to drive the jaw teeth 43 onto the sides of a tube to be pulled. The jaw 41 is inserted into a tube 70 mounted in a tube sheet 71 and expands to grip the inside walls of the tube with the jaw teeth 43 to grip the tube while the tube is being pulled. Puller shaft 31 has a puller shaft piston 44 threadedly attached on one end and held in a forward position by a return spring 45 supported by a piston cap 46. The puller tube 33 slides on the inner shaft 31 and within the brace tube 38 and within the front housing 47 which is threaded onto the housing portion 11 and sealed with an O-ring 48. The puller tube 33 is connected to a puller tube piston 50 which slides on the housing portion 11 over the O-ring 51 on the outside and adjacent the shaft piston 44 on the O-ring 52. The outer piston 50 has a plurality of check valves 53 passing therethrough.

The spool valve portion 60 is formed into the shaft 31 and collects fluid under pressure from the hydraulic fluid where it is held under pressure until the shaft 31 is retracted far enough (¾") for the spool area 60 to reach the port 61 where the fluid under pressure is driven into the chamber area 58 to drive the piston 50 towards the rear to pull the puller tube 33 towards the rear and in turn pull the jaws 41 to the rear to pull a tube 70 held by the jaws 41. A lock nut 63 is used to lock the brace tube 38 against the housing portion 47 to prevent the brace tube 38 from coming loose.

In operation, the tube puller is in a resting mode with the trigger 10 not depressed and the puller jaws 42 extended so that the ball 18 blocks air flow through the line to port 22. This builds up air pressure in the line 19 and causes the valve 29 to shift positions. In this position, hydraulic fluid is pressurized in the intensifier 9 hydraulic cylinder 66 and flows into port 62 of the tube puller filling chamber 64. At the same time, the hydraulic fluid in chamber 58 is depressurized. Spring 45 forces the inner piston 44 forward. This closes off the spool valve 60. Hydraulic fluid in chamber 58 is exhausted by flowing through eight check valves 53 in the face of the outer piston 50. The hydraulic fluid then flows through ports 55 and the annular space 54 into a void area 32 and through feeder tube 25 and then through channel 27 and exits the tube puller 10 through port 24 into a hydraulic hose 68 to return to the intensifier unit 9.

The process is reversed when the trigger 10 is depressed. This forces pushrod 17 to unseat ball 18 and depressurizes the airline 19. This allows springs in the pneumatic valve 29 to shift positions of the valve causing the intensifier 9 to stroke. This depressurizes the hydraulic fluid in chamber 64 and causes at the same time hydraulic fluid under pressure to enter port 24. The hydraulic fluid then flows through channel 27 and feeder tube 25 filling the open area 32. The fluid then flows around the annular space 54 through ports 55 into chamber 56 forcing the inner piston 44 to travel rearward against spring 45 until the spool valve area 60 is unported allowing hydraulic fluid under pressure to travel through the spool valve area 60 then through ports 61 into chamber 58 forcing piston 50 to travel rearward in the cylinder.

Because the hydraulic fluid in chamber 64 is depressurized, the rearward movement of piston 50 forces the oil in chamber 64 to exhaust through port 62 through a hydraulic line back to the intensifier unit. The hydraulic system is thus a closed system with no reservoir. Any movement of the intensifier 9 piston 69 results in an equal movement of the tube puller piston.

It should be clear at this time that a hydraulic tube puller powered by a pneumatic/hydraulic intensifier has been provided which solves problems with prior hydraulic tube pullers. The shaft 31 has to travel far enough to expand the jaws and set the puller jaws in a tube. The spool valve does not unport the channeling to fill the outer piston chamber until the inner piston travels at least a predetermined distance, such as ¾". This solves the problem of the retracting tube retracting before the jaws are properly set and causing the unit to slip out of the tube. The addition of the spring 45 and the check valves 53 allow the puller tube 33 to release a tube first before the puller tube extends out to reduce the dead-time waiting for the puller to extend before going to the next tube. However, the present invention is not to be construed as limited to the forms shown which are to be considered illustrative rather than restrictive.

I claim:

1. A tube pulling apparatus comprising:
   a source of pressurized hydraulic fluid;
   a body;
   a hydraulic fluid feeder line extending into said body to pass hydraulic fluid under pressure therethrough from said source of pressurized hydraulic fluid;
   a pull shaft having a hollow portion slidably mounted over said hydraulic fluid feeder line for receiving hydraulic fluid therein from said source of pressurized hydraulic fluid;
   an inner piston connected to said pull shaft and positioned to move said pull shaft responsive to hydraulic fluid pressure from said source of pressurized hydraulic fluid;
   a puller tube slidably mounted over said pull shaft;
   an outer piston connected to said puller tube and positioned to move said puller tube responsive hydraulic fluid pressure from said source of pressurized hydraulic fluid;
   a spool valve formed between said pull shaft and said puller tube for activating said outer piston upon a predetermined movement of said pull shaft inside said puller tube; and tube gripping means connected to said pull shaft and puller tube for gripping and pulling a tube therewith by sliding said pull shaft to activate said gripping means and sliding said puller tube to pull said gripped tube.

2. A tube pulling apparatus in accordance with claim 1 in which said pull shaft pulls a cam to spread gripping means locking jaws.

3. A tube pulling apparatus in accordance with claim 1 in which said pull shaft has a spool portion formed thereon.

4. A tube pulling apparatus in accordance with claim 3 in which said puller tube has at least one aperture port therein aligned for intersecting said pull shaft spool portion upon said pull shaft moving a predetermined distance.

5. A tube pulling apparatus in accordance with claim 4 in which said outer piston has a check valve therethrough.

6. A tube pulling apparatus in accordance with claim 5 in which said inner piston has a return spring biased thereagainst.

7. A tube pulling apparatus in accordance with claim 6 in which said body has a pair of hydraulic fluid lines connected to said source of pressurized hydraulic fluid.

8. A tube pulling apparatus in accordance with claim 7 in which said pull shaft has a gripping jaw expanding cam member attached to one end thereof.

9. A tube pulling apparatus in accordance with claim 8 in which said cam member is threadedly attached to said pull shaft.

10. A tube pulling apparatus in accordance with claim 9 in which said gripping jaw is held by said puller shaft.

* * * * *